United States Patent
Jarvis

(10) Patent No.: US 11,843,230 B2
(45) Date of Patent: Dec. 12, 2023

(54) APPARATUS AND METHOD FOR CUTTING AND STRIPPING AN ELECTRICAL CABLE

(71) Applicant: Stride Tool, LLC, Glenwillow, OH (US)

(72) Inventor: Ryan David Jarvis, Mentor, OH (US)

(*) Notice: Subject to any disclaimer, the term of this patent is extended or adjusted under 35 U.S.C. 154(b) by 109 days.

(21) Appl. No.: 16/750,350

(22) Filed: Jan. 23, 2020

(65) Prior Publication Data
US 2021/0234346 A1 Jul. 29, 2021

(51) Int. Cl.
*H02G 1/12* (2006.01)

(52) U.S. Cl.
CPC ......... *H02G 1/1214* (2013.01); *H02G 1/1236* (2013.01)

(58) Field of Classification Search
CPC .... H02G 1/005; H02G 1/1204; H02G 1/1209; H02G 1/1214; H02G 1/1295
USPC .......................... 30/91.2; 81/9.4, 9.51; 83/924
See application file for complete search history.

(56) References Cited

U.S. PATENT DOCUMENTS

| | | | | |
|---|---|---|---|---|
| 520,818 A * | 6/1894 | Bettinger | ............. | H02G 1/1214 30/91.2 |
| 1,065,679 A * | 6/1913 | Gregson et al. | ..... | H02G 1/1214 30/91.2 |
| 1,131,473 A * | 3/1915 | Courtney | ............. | H02G 1/1214 30/186 |
| 1,349,563 A * | 8/1920 | Day | ........................ | B25B 7/18 30/90.1 |
| 1,354,365 A | 9/1920 | Aaron | | |
| 1,490,459 A * | 4/1924 | Fergusson | ............ | H02G 1/1224 30/90.1 |
| 1,800,317 A * | 4/1931 | Ries | ...................... | H02G 1/1229 30/90.1 |
| 2,386,327 A * | 10/1945 | Martin | .................. | H02G 1/1214 30/91.2 |
| 2,668,464 A * | 2/1954 | Paules | .................. | H01R 43/042 30/91.2 |
| 2,697,956 A * | 12/1954 | Cook, Jr. | .................. | B25B 7/04 30/91.2 |
| 3,564,952 A * | 2/1971 | Metcalf | ................ | H02G 1/1212 81/9.42 |

(Continued)

FOREIGN PATENT DOCUMENTS

| | | | | |
|---|---|---|---|---|
| DE | 30 02 302 | * | 8/1980 | ........... H02G 1/1214 |
| FR | 1.597.929 | * | 6/1970 | ........... H02G 1/1214 |

*Primary Examiner* — Sean M Michalski
(74) *Attorney, Agent, or Firm* — TAROLLI, SUNDHEIM, COVELL & TUMMINO L.L.P.

(57) ABSTRACT

An electrical stripping and cutting tool has first and second elongated members. The second elongated member is joined to the first elongated member such that the first and second elongated members are pivotable about a laterally extending pivot axis relative to each other. First and second face plates are attached to distal ends of the first and second elongated members. The first and second face plates are oriented substantially perpendicular to a longitudinal axis of the first and second elongated members. In a closed position of the electrical cable stripping and cutting tool, the first and second face plates collectively form a single flat face plate. At least one first side pair of cutting members is formed on a first side of the first and second face plates. At least one second side pair of cutting members is formed on a second side of the first and second face plates.

23 Claims, 8 Drawing Sheets

(56) References Cited

U.S. PATENT DOCUMENTS

| | | | | |
|---|---|---|---|---|
| 3,771,222 A * | 11/1973 | Sakuma | ............... | H02G 1/1214 30/90.1 |
| 3,795,023 A * | 3/1974 | Miragliotta | .......... | H02G 1/1212 30/90.1 |
| 3,980,861 A * | 9/1976 | Fukunaga | ................ | H05B 3/00 83/171 |
| 4,162,638 A * | 7/1979 | McCord | ............... | H02G 1/1214 30/90.1 |
| 4,189,799 A * | 2/1980 | Litehizer, Jr. | ........ | H02G 1/1229 30/90.6 |
| 4,748,871 A * | 6/1988 | Zdzislaw | ............. | H02G 1/1214 30/90.1 |
| 5,295,421 A * | 3/1994 | Mansfield | ............... | G02B 6/245 30/90.1 |
| 5,323,502 A * | 6/1994 | Miller | ................ | H01R 43/0421 7/107 |
| 6,012,357 A * | 1/2000 | John | .................... | H02G 1/1214 30/90.1 |
| 6,502,310 B1 * | 1/2003 | Shaw | ................... | H02G 1/1295 81/9.44 |
| 9,472,927 B2 | 10/2016 | Satern | | |
| D771,458 S * | 11/2016 | Yen | ................................ | D8/52 |
| 2004/0255390 A1 * | 12/2004 | Kinkade | ................ | B25D 1/045 7/144 |
| 2006/0059691 A1 * | 3/2006 | Wiste | ................... | H02G 1/1214 30/90.1 |
| 2019/0058313 A1 | 2/2019 | Murg | | |
| 2019/0058314 A1 | 2/2019 | Murg | | |

* cited by examiner

APPARATUS AND METHOD FOR CUTTING AND STRIPPING AN ELECTRICAL CABLE

TECHNICAL FIELD

This disclosure relates to an apparatus and method for use of an electrical cable stripping and cutting tool and, more particularly, to an apparatus and method for cutting and stripping an electrical cable.

BACKGROUND

An electrician or another individual may often work with electrical cables. For example, the electrical cable may have a non-metallic outer sheath that surrounds multiple an electrical conductor. The electrician or another individual may want to cut the outer sheath and strip a length of the outer sheath away from the conductor without cutting, nicking, or otherwise damaging the electrical conductor.

SUMMARY

In an aspect, an electrical cable stripping and cutting tool is provided. The electrical cable has an outer sheath radially surrounding an electrical conductor. The electrical cable stripping and cutting tool has a first elongated member. The first elongated member has a proximal end and a longitudinally opposite distal end. A second elongated member has a proximal end and a longitudinally opposite distal end. The second elongated member is joined to the first elongated member such that the first and second elongated members are pivotable about a laterally extending pivot axis relative to each other. A first face plate is attached to the distal end of the first elongated member. The first face plate is oriented substantially perpendicular to a longitudinal axis of the first elongated member. The first face plate has a first side and a laterally opposite second side. A second face plate is attached to the distal end of the second elongated member. The second face plate is oriented substantially perpendicular to a longitudinal axis of the second elongated member. The second face plate has a first side and a laterally opposite second side. In a closed position of the electrical cable stripping and cutting tool, the first side of the first face plate abuts the first side of the second face plate, the second side of the first face plate abuts the second side of the second face plate, and the first and second face plates collectively form a single flat face plate. At least one first side pair of cutting members is formed on the first side of the first and second face plates. Each of the at least one first side pair of cutting members has a cutting surface presented toward the other cutting surface of the at least one first side pair of cutting members. At least one second side pair of cutting members is formed on the second side of the first and second face plates. Each of the at least one second side pair of cutting members has a cutting surface presented toward the other cutting surface of the at least one second side pair of cutting members. The cutting surfaces of the at least one first side pair of cutting members are shaped and dimensioned to cut through an outer sheath of an electrical cable having a different sheath dimension than an outer sheath of an electrical cable that the cutting surfaces of the at least one second side pair of cutting members are shaped and dimensioned to cut through. The cutting surfaces of the first and second side pairs of cutting members are configured to cut through the outer sheaths without cutting through the electrical conductors within the outer sheaths.

In an aspect, a method for cutting and stripping an electrical cable is provided. An electrical cable including an outer sheath surrounding an electrical conductor is provided. An electrical cable stripping and cutting tool is provided. The electrical cable stripping and cutting tool has a first elongated member. The first elongated member has a proximal end and a longitudinally opposite distal end. A second elongated member has a proximal end and a longitudinally opposite distal end. The second elongated member is joined to the first elongated member such that the first and second elongated members are pivotable about a laterally extending pivot axis relative to each other. A first face plate is attached to the distal end of the first elongated member. The first face plate is oriented substantially perpendicular to a longitudinal axis of the first elongated member. The first face plate has a first side and a laterally opposite second side. A second face plate is attached to the distal end of the second elongated member. The second face plate is oriented substantially perpendicular to a longitudinal axis of the second elongated member. The second face plate has a first side and a laterally opposite second side. In a closed position of the electrical cable stripping and cutting tool, the first side of the first face plate abuts the first side of the second face plate, the second side of the first face plate abuts the second side of the second face plate, and the first and second face plates collectively form a single flat face plate. At least one first side pair of cutting members is formed on the first side of the first and second face plates. Each of the at least one first side pair of cutting members has a cutting surface presented toward the other cutting surface of the at least one first side pair of cutting members. At least one second side pair of cutting members is formed on the second side of the first and second face plates. Each of the at least one second side pair of cutting members has a cutting surface presented toward the other cutting surface of the at least one second side pair of cutting members. The cutting surfaces of the at least one first side pair of cutting members are shaped and dimensioned to cut through an outer sheath of an electrical cable having a different sheath dimension than an outer sheath of an electrical cable that the cutting surfaces of the at least one second side pair of cutting members are shaped and dimensioned to cut through. The cutting surfaces of the first and second side pairs of cutting members are configured to cut through the outer sheaths without cutting through the electrical conductors within the outer sheaths. The electrical cable stripping and cutting tool is moved to an open position. It is determined whether the outer sheath of the electrical cable has a sheath dimension that corresponds to dimensions of the cutting surfaces of the at least one first side pair of cutting members or to the dimensions of the cutting surfaces of the at least one second side pair of cutting members. When it is determined that the outer sheath of the electrical cable has the sheath dimension that corresponds to dimensions of the cutting surfaces of the at least one first side pair of cutting members, a cut portion of the outer sheath is removed from the electrical cable to expose a portion of the electric conductor by placing at least a portion of the electrical cable having the sheath dimension that corresponds to dimensions of the cutting surfaces of the at least one first side pair of cutting members longitudinally between the at least one first side pair of cutting members. With the electrical cable having the sheath dimension that corresponds to dimensions of the cutting surfaces of the at least one first side pair of cutting members longitudinally between the at least one first side pair of cutting members, a portion of the outer sheath is cut at least partially through by moving the electrical cable stripping and cutting tool toward the closed position. Motion of the electrical cable stripping and cutting tool toward the closed position causes the cutting surfaces of the at least one first side pair of cutting members to move together over the electrical cable to cut at least partially through a portion of the outer sheath of the electrical cable. The cut portion of the outer sheath is removed. When it is determined that the outer sheath of the electrical cable has the sheath dimension that corresponds to dimensions of the cutting surfaces of the at least one second side pair of cutting members, a cut portion of the outer sheath is removed from the electrical cable to expose a portion of the electric conductor by placing at least a portion of the electrical cable having the sheath dimension that corresponds to dimensions of the cutting surfaces of the at least one second side pair of cutting members longitudinally between the at least one second side pair of cutting members. With the electrical cable having the sheath dimension that corresponds to dimensions of the cutting surfaces of the at least one second side pair of cutting members longitudinally between the at least one second side pair of cutting members, a portion of the outer sheath is cut at least partially through by moving the electrical cable stripping and cutting tool toward the closed position. Motion of the electrical cable stripping and cutting tool toward the closed position causes the cutting surfaces of the at least one second side pair of cutting members to move together over the electrical cable to cut at least partially through a portion of the outer sheath of the electrical cable. The cut portion of the outer sheath is removed.

BRIEF DESCRIPTION OF THE DRAWINGS

For a better understanding, reference may be made to the accompanying drawings, in which.

DESCRIPTION OF EMBODIMENTS

Figure 1:
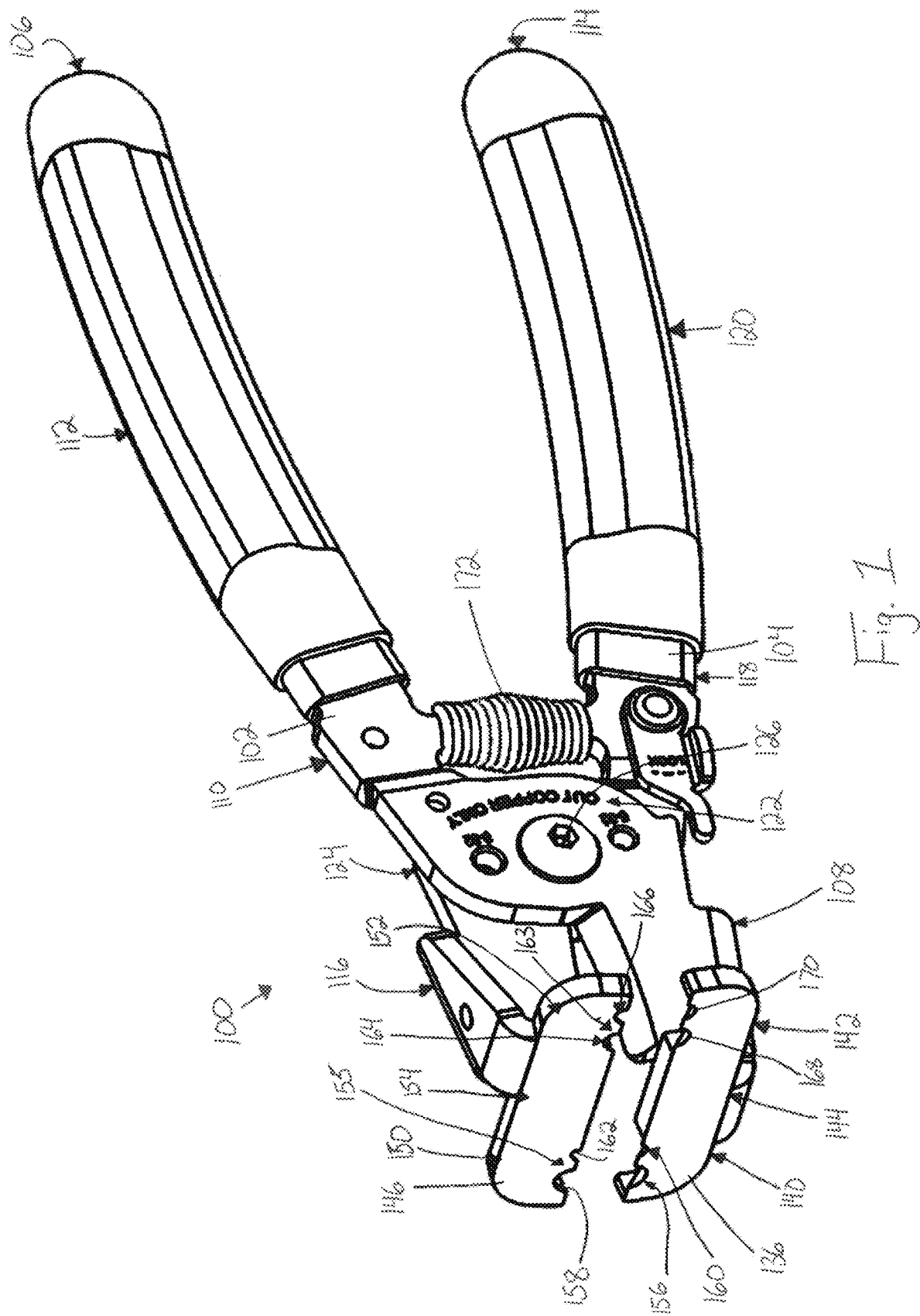
FIG. 1 is a perspective side view of an electrical cable stripping and cutting tool according to one aspect of the present invention, in an open configuration.

Unless defined otherwise, all technical and scientific terms used herein have the same meaning as is commonly understood by one of skill in the art to which the present disclosure pertains.

As used herein, the term "user" can be used to refer to an individual who prepares for, assists with, and/or performs the operation of a tool.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" can be interpreted to include X and Y.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that when an element is referred to as being "on," "attached" to, "connected" to, etc., another element, it can be directly on, attached to or connected to the other element or intervening elements may also be present. In contrast, when an element is referred to as being, for example, "directly attached" to another element, there are no intervening elements present. It will also be appreciated by those of skill in the art that references to a structure or feature that is disposed "adjacent" another feature may not have portions that overlap or underlie the adjacent feature.

Spatially relative terms, such as "over" and the like, may be used herein for ease of description to describe one element or feature's relationship to another element(s) or feature(s) as illustrated in the Figures. It will be understood that the spatially relative terms can encompass different orientations of a device in use or operation, in addition to the orientation depicted in the Figures. For example, if a device in the Figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or Figures unless specifically indicated otherwise.

The invention comprises, consists of, or consists essentially of the following features, in any combination.

FIG. 1 depicts an electrical cable stripping and cutting tool 100 for stripping an electrical cable having an outer sheath radially surrounding an electrical conductor. Electrical conductors typically have standardized sizes, such as, but not limited to, 6 Gauge and 10 Gauge, assigned by systems such as the American Wire Gauge.

The electrical cable stripping and cutting tool 100 has first and second elongated members 102, 104. The first elongated member 102 has a proximal end 106, a longitudinally opposite distal end 108, and a length 110 extending from the proximal end 106 of the first elongated member 102 to the distal end 108 of the first elongated member 102. The term "longitudinal" is used herein to indicate a substantially horizontal direction, in the orientation of FIG. 2. As shown in FIG. 1, the first elongated member 102 may have a handle portion 112 that extends distally from the proximal end 106 of the first elongated member 102 for at least a portion of the length 110 of the first elongated member 102.

The second elongated member 104 has a proximal end 114, a longitudinally opposite distal end 116, and a length 118 that extends from the proximal end 114 of the second elongated member 104 to the distal end 116 of the second elongated member 104. The second elongated member 104 may have a handle portion 120 that extends distally from the proximal end 114 of the second elongated member 104 for at least a portion of the length 118 of the second elongated member 104. Each handle portion 112, 120 may be at least partially ergonomically shaped, rubber-coated, cushioned, and/or have any suitable characteristics for assisting a user with comfortably gripping the electrical cable stripping and cutting tool 100 for use as desired.

A connecting portion 122 may be formed in the length of the first elongated member 102. A similar connecting portion 124 may also be formed at approximately the same position along the length of the second elongated member 104. The first and second elongated members 102, 104 may be placed side by side at the connecting portions 122, 124. As shown FIG. 1, the connecting portions 122, 124 may have a substantially ovoid, disc-like shape. Alternatively, the connecting portions 122, 124 may have any other suitable shape as desirable for a particular application.

Figure 2:
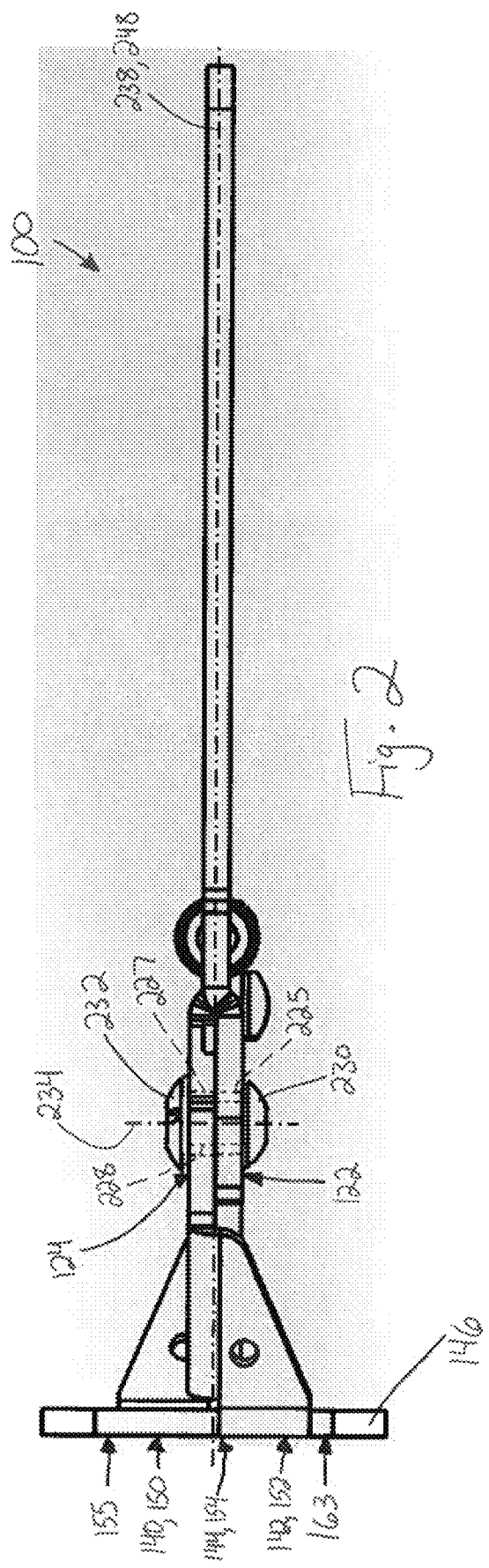
FIG. 2 is a top view of the aspect of FIG. 1.

As shown in FIG. 2, each connecting portion 122, 124 has an opening 225, 227 that passes laterally through the corresponding first or second elongated member 102, 104. When the first and second elongated members 102, 104 are placed side by side at the connecting portions 122, 124, the openings 225, 227 are laterally aligned. The term "lateral" is used herein to indicate a direction substantially perpendicular to the "longitudinal" direction, and is shown as the vertical direction in the orientation of FIG. 2. A fastener 126 is received in the aligned openings 225, 227. As shown in FIG. 2, the fastener 126 has a shaft 228 received in the aligned openings 225, 227. At opposite ends of the shaft 228, the fastener 126 has enlargements 230, 232 that are too large to pass through the aligned openings 225, 227 in the connecting portions 122, 124. The enlargements 230, 232 may be permanently fixed to the shaft 228, as by being formed in one piece with the shaft 228, or may be removable from the shaft 228, as by being nuts engaged with a threaded portion of the shaft 228. The fastener 126 may be a rivet, if it is desired to join the first elongated member 102 to the second elongated member 104 in a permanent or nonremovable manner, or may be a bolt with a removably attached nut, if it is desired to join the first elongated member 102 to the second elongated member 104 in a manner that can be reversed as may be desired, for example, for replacement of one of the first and second elongated members 102, 104.

The shaft 228 of the fastener 126 provides a laterally oriented axle or shaft for pivotal movement of the first and second elongated members 102, 104 relative to one another. Thus, the second elongated member 104 is joined to the first elongated member 102 such that the first and second elongated members 102, 104 are pivotable about a laterally extending pivot axis 234, corresponding to the shaft 228 of the fastener 126, relative to each other.

As shown in FIGS. 1-2, a first face plate 136 is attached to the distal end 108 of the first elongated member 102. The first face plate 136 is oriented substantially perpendicular to a longitudinal axis 238 of the first elongated member 102 (FIG. 2). The first face plate 136 has a first side 140 and a laterally opposite second side 142 and a length 144 extending laterally from the first side 140 of the first face plate 136 to the second side 142 of the first face plate 136.

A second face plate 146 is attached to the distal end 116 of the second elongated member 104. The second face plate 146 is oriented substantially perpendicular to a longitudinal axis 248 of the second elongated member 104 (FIG. 2). The second face plate 146 has a first side 150 and a laterally opposite second side 152 and a length 154 extending laterally from the first side 150 of the second face plate 146 to the second side 152 of the second face plate 146.

Figure 3:
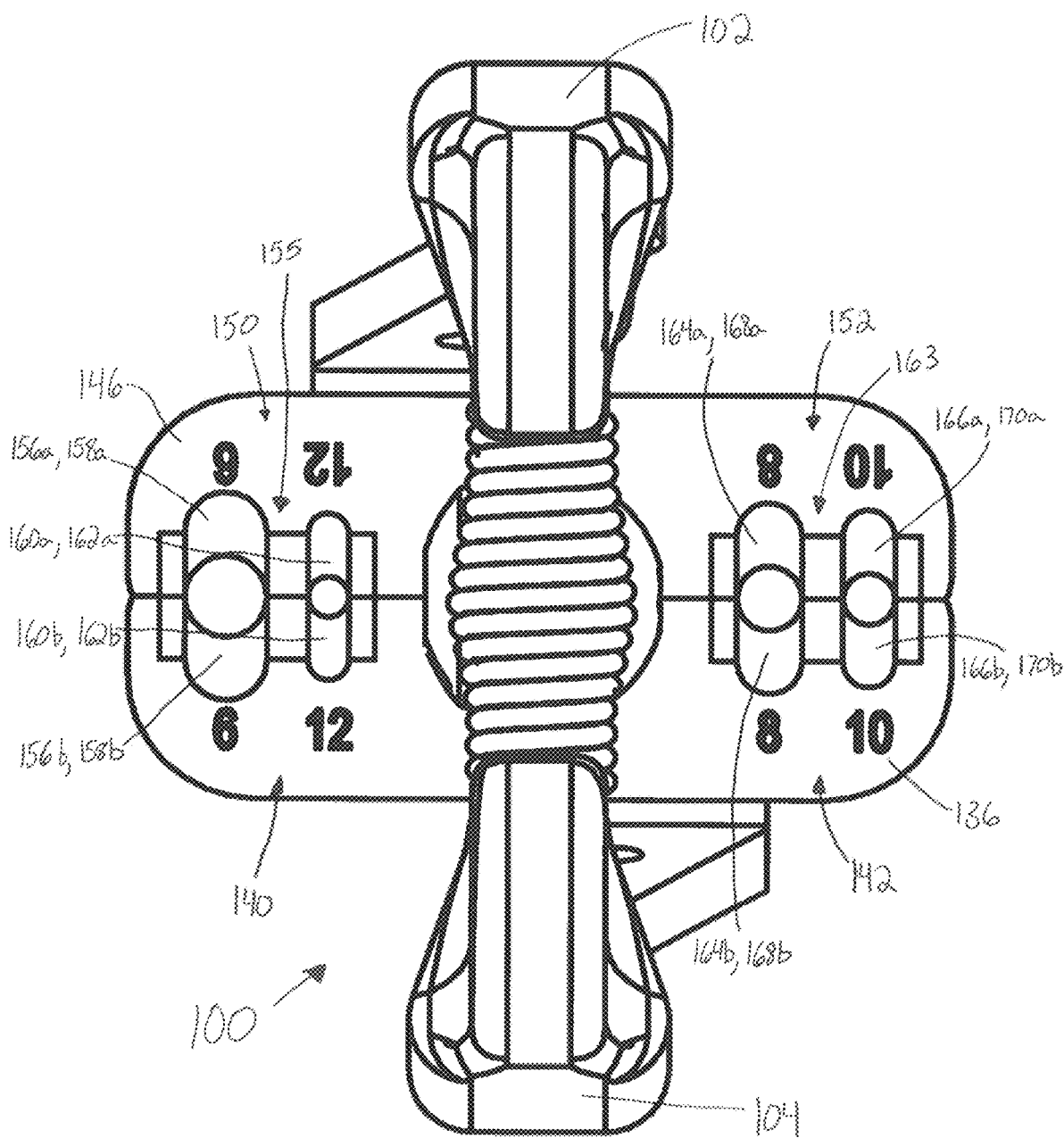
FIG. 3 is a rear view of the aspect of FIG. 1, in a closed configuration.

Referring to FIGS. 1-3, at least one first side pair of cutting members 155 is formed on the first side 140, 150 of the first and second face plates 136, 146. As shown in the example configuration of FIGS. 1-3, the at least one first side pair of cutting members 155 includes first and second pairs of cutting members 156, 160 (shown here as the first pair of cutting members 156a, 156b and the second pair of cutting members 160a, 160b) formed on the first side 140, 150 of the first and second face plates 136, 146. One of the first pair of cutting members 156a, 156b is formed on one of the first and second face plates 136, 146. The other of the first pair of cutting members 156a, 156b is formed on the other of the first and second face plates 136, 146. Each of the first pair of cutting members 156a, 156b has a cutting surface 158 (shown here as the cutting surfaces 158a, 158b) oriented lateral to the longitudinal axis 238 of the first elongated member 102 and the longitudinal axis 248 of the second elongated member 104 (FIG. 3). Each cutting surface 158a, 158b of the first pair of cutting members 156a, 156b is presented toward the other cutting surface 158a, 158b of the first pair of cutting members 156a, 156b. The cutting surfaces 158a, 158b of the first pair of cutting members 156a, 156b are shaped and dimensioned to cut through an outer sheath of an electrical cable having a first sheath dimension without cutting an electrical conductor within the outer sheath when at least a portion of the electrical cable extends longitudinally between the first pair of cutting members 156a, 156b.

"Cut through", "cutting", and similar language, as used herein, are intended to indicate that the "cut" item is substantially severed. For example, an outer sheath could be considered to be "cut through" at a circumference thereof by the electrical cable stripping and cutting tool 100, even if some minimal portion of the outer sheath is still attached (e.g., at opposite diameters of the outer sheath), as long as a minor effort can readily be exerted to snap the still-attached portion in a frangible manner. As a result, these remaining attachments can be used to ensure that a "cut" off portion does not slip off unwantedly.

It is also intended that the term "without cutting" is interpreted throughout as meaning "without substantially cutting" the subject structure. For example, the outer sheath of the electrical cable should be considered to have been cut through "without cutting" the individual conductor insulation, while still admitting of some slight amount of nicking, slicing, denting, creasing, marking, or other permanent or temporary damage or alteration to the individual conductor insulation, as long as the individual conductor insulation is not cut through (as previously discussed). One of ordinary skill in the art will recognize that manufacturing tolerances, the tool usage style of an individual user, variances in electrical cable sizes, and other factors could contribute to a situation wherein the "cut" or "not cut" status of a component of the electrical cable can vary and is not a binary or absolute determination.

As shown in FIGS. 1-3, one of the second pair of cutting members 160a, 160b is formed on one of the first and second face plates 136, 146. The other of the second pair of cutting members 160a, 160b is formed on the other of the first and second face plates 136, 146. Each of the second pair of cutting members 160a, 160b has a cutting surface 162 (shown here as the cutting surfaces 162a, 162b) oriented lateral to the longitudinal axis 238 of the first elongated member 102 and the longitudinal axis 248 of the second elongated member 104 (FIG. 3). Each cutting surface 162a, 162b of the second pair of cutting members 160a, 160b is presented toward the other cutting surface 162a, 162b of the second pair of cutting members 160a, 160b. The cutting surfaces 162a, 162b of the second pair of cutting members 160a, 160b are shaped and dimensioned to cut through an outer sheath of an electrical cable having a second sheath dimension, which is different than the first sheath dimension, without cutting an electrical conductor within the outer sheath when at least a portion of the electrical cable extends longitudinally between the second pair of cutting members 160a, 160b. In the example configuration of FIGS. 1-3, the second sheath dimension of the outer sheath that the cutting surfaces 162a, 162b of the second pair of cutting members 160a, 160b are shaped and dimensioned to cut through is smaller than the first sheath dimension of the outer sheath that the cutting surfaces 158a, 158b of the first pair of cutting members 156a, 156b are shaped and dimensioned to cut through.

Referring to FIGS. 1-3, at least one second side pair of cutting members 163 is formed on the second side 142, 152 of the first and second face plates 136, 146. As shown in the example configuration of FIGS. 1-3, the at least one second side pair of cutting members 163 includes third and fourth pairs of cutting members 164, 166 (shown here as the third pair of cutting members 164a, 164b and the fourth pair of cutting members 166a, 166b) formed on the second side 142, 152 of the first and second face plates 136, 146. One of the third pair of cutting members 164a, 164b is formed on one of the first and second face plates 136, 146. The other of the third pair of cutting members 164a, 164b is formed on the other of the first and second face plates 136, 146. Each of the third pair of cutting members 164a, 164b has a cutting surface 168 (shown here as the cutting surfaces 168a, 168b) oriented lateral to the longitudinal axis 238 of the first elongated member 102 and the longitudinal axis 248 of the second elongated member 104 (FIG. 3). Each cutting surface 168a, 168b of the third pair of cutting members 164a, 164b is presented toward the other cutting surface 168a, 168b of the third pair of cutting members 164a, 164b. The cutting surfaces 168a, 168b of the third pair of cutting members 164a, 164b are shaped and dimensioned to cut through an outer sheath of an electrical cable having a third sheath dimension, which is different than each of the first and second sheath dimensions, without cutting an electrical conductor within the outer sheath when at least a portion of the electrical cable extends longitudinally between the third pair of cutting members 164a, 164b.

As shown in FIGS. 1-3, one of the fourth pair of cutting members 166a, 166b is formed on one of the first and second face plates 136, 146. The other of the fourth pair of cutting members 166a, 166b is formed on the other of the first and second face plates 136, 146. Each of the fourth pair of cutting members 166a, 166b has a cutting surface 170 (shown here as the cutting surfaces 170a, 170b) oriented lateral to the longitudinal axis 238 of the first elongated member 102 and the longitudinal axis 248 of the second elongated member 104 (FIG. 3). Each cutting surface 170a, 170b of the fourth pair of cutting members 166a, 166b is presented toward the other cutting surface 170a, 170b of the fourth pair of cutting members 166a, 166b. The cutting surfaces 170a, 170b of the fourth pair of cutting members 166a, 166b are shaped and dimensioned to cut through an outer sheath of an electrical cable having a fourth sheath dimension, which is different than the first, second, and third sheath dimensions, without cutting an electrical conductor within the outer sheath when at least a portion of the electrical cable extends longitudinally between the fourth pair of cutting members 166a, 166b.

In the example configuration of FIGS. 1-3, the fourth sheath dimension of the outer sheath that the cutting surfaces 170a, 170b of the fourth pair of cutting members 166a, 166b are shaped and dimensioned to cut through is smaller than the first sheath dimension of the outer sheath that the cutting surfaces 158a, 158b of the first pair of cutting members 156a, 156b are shaped and dimensioned to cut through, larger than the second sheath dimension of the outer sheath that the cutting surfaces 162a, 162b of the second pair of cutting members 160a, 160b are shaped and dimensioned to cut through, and smaller than the third sheath dimension of the outer sheath that the cutting surfaces 168a, 168b of the third pair of cutting members 164a, 164b are shaped and dimensioned to cut through. The third sheath dimension of the outer sheath that the cutting surfaces 168a, 168b of the third pair of cutting members 164a, 164b are shaped and dimensioned to cut through is smaller than the first sheath dimension of the outer sheath that the cutting surfaces 158a, 158b of the first pair of cutting members 156a, 156b are shaped and dimensioned to cut through, and larger than the second sheath dimension of the outer sheath that the cutting surfaces 162a, 162b of the second pair of cutting members 160a, 160b are shaped and dimensioned to cut through.

Because the first pair of cutting members 156a, 156b is designed to cut through an outer sheath of an electrical cable having a first sheath dimension, the second pair of cutting members 160a, 160b is designed to cut through an outer sheath of an electrical cable having a second sheath dimension, the third pair of cutting members 164a, 164b is designed to cut through an outer sheath of an electrical cable having a third sheath dimension, and the fourth pair of cutting members 166a, 166b is designed to cut through an outer sheath of an electrical cable having a fourth sheath dimension, the electrical cable stripping and cutting tool 100 provides a user with the ability to cut through the outer sheaths of electrical cables having any one of the first, second, third, and fourth sheath dimensions without having to use four separate tools. For example, the first pair of cutting members 156a, 156b may be at least partially shaped and dimensioned to cut through an outer sheath surrounding a 6 Gauge electrical conductor. The second pair of cutting members 160a, 160b may be at least partially shaped and dimensioned to cut through an outer sheath surrounding a 12 Gauge electrical conductor. The third pair of cutting members 164a, 164b may be at least partially shaped and dimensioned to cut through an outer sheath surrounding an 8 Gauge electrical conductor. The fourth pair of cutting members 166a, 166b may be at least partially shaped and dimensioned to cut through an outer sheath surrounding a 10 Gauge electrical conductor.

The outer sheath surrounding a 6 Gauge electrical conductor is typically larger than the outer sheath surrounding an 8 Gauge electrical conductor, because 6 Gauge electrical conductors have a larger diameter than 8 Gauge electrical conductors. The outer sheath surrounding an 8 Gauge electrical conductor is typically larger than the outer sheath surrounding a 10 Gauge electrical conductor, because 8 Gauge electrical conductors have a larger diameter than 10 Gauge electrical conductors. The outer sheath surrounding a 10 Gauge electrical conductor is typically larger than the outer sheath surrounding a 12 Gauge electrical conductor, because 10 Gauge electrical conductors have a larger diameter than 12 Gauge electrical conductors. In such case, the electrical cable stripping and cutting tool 100 is applicable to cut through the outer sheath surrounding a 6 Gauge electrical conductor, using the first pair of cutting members 156a, 156b, a 12 Gauge electrical conductor, using the second pair of cutting members 160a, 160b, a 8 Gauge electrical conductor, using the third pair of cutting members 164a, 164b, and a 10 Gauge electrical conductor, using the fourth pair of cutting members 166a, 166b. Although the outer sheath surrounding 6, 12, 8, and 10 Gauge electrical conductors have been described above as being cut by the first, second, third, and fourth pairs of cutting members 156a, 156b, 160a, 160b, 164a, 164b, 166a, 166b, respectively, the first, second, third, and fourth pairs of cutting members 156a, 156b, 160a, 160b, 164a, 164b, 166a, 166b may be at least partially shaped and dimensioned to cut through the outer sheath of any desired gauged electrical conductor.

Referring back to FIG. 1, the electrical cable stripping and cutting tool 100 is shown in an open position. In the open position, the handle portions 112, 120 of the first and second elongated members 102, 104 are spaced apart further than they are in a closed position, as will be discussed later, the first side 140 of the first face plate 136 is spaced apart from the first side 150 of the second face plate 146, and the second side 142 of the first face plate 136 is spaced apart from the second side 152 of the second face plate 146. The electrical cable stripping and cutting tool 100 may have a biasing member 172, such as a spring, that extends between the first and second elongated members 102, 104. The biasing member 172, when present, biases the electrical cable stripping and cutting tool 100 toward the open position.

Figure 4:
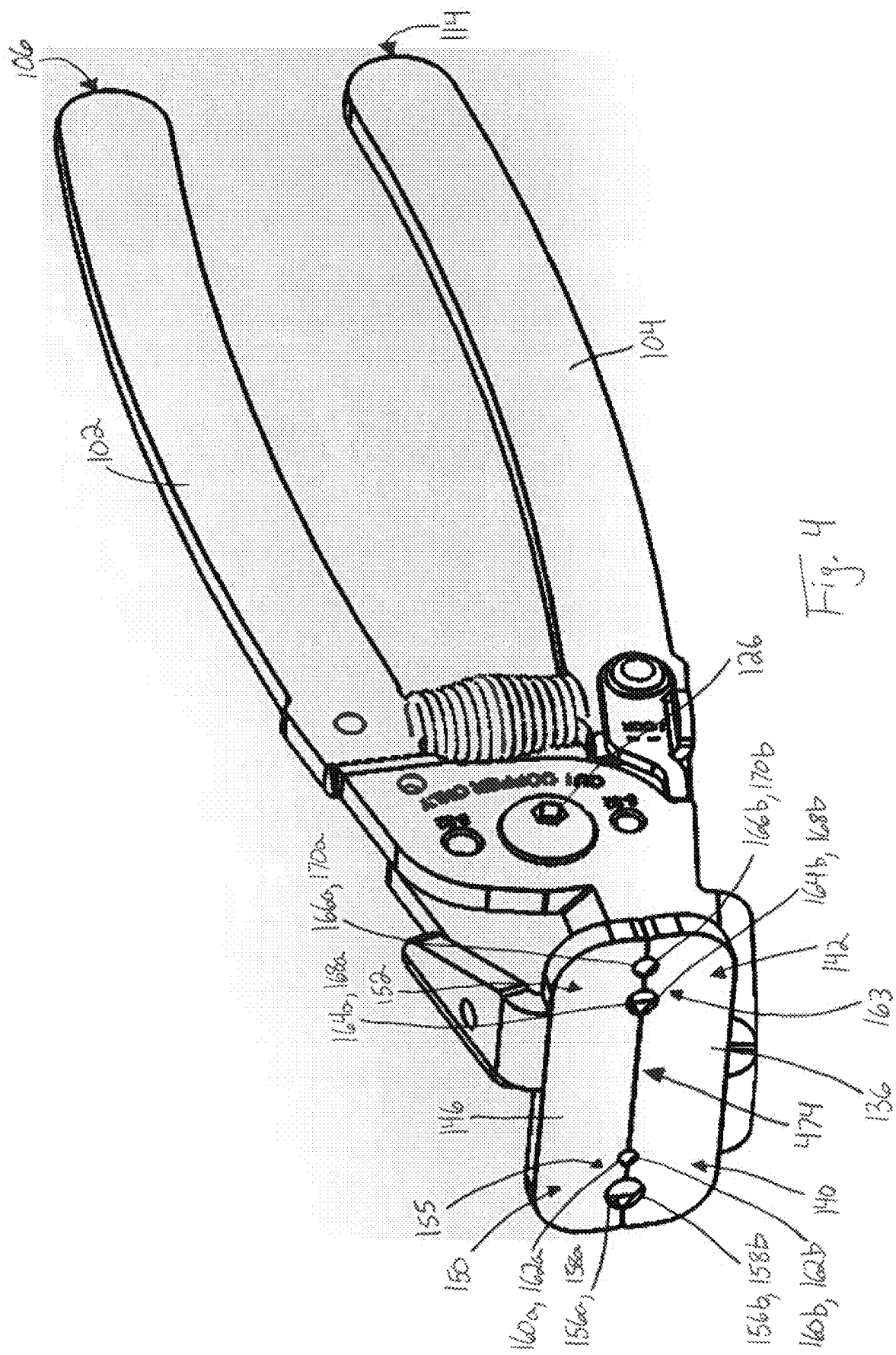
FIG. 4 is a perspective side view of the aspect of FIG. 1, in the closed configuration.

FIG. 4 depicts the electrical cable stripping and cutting tool 100 in a closed position. In the closed position of the electrical cable stripping and cutting tool 100, the first side 140 of the first face plate 136 abuts the first side 150 of the second face plate 146, the second side 142 of the first face plate 136 abuts the second side 152 of the second face plate 146, and the first and second face plates 136, 146 collectively form a single flat face plate 474. As shown in FIGS. 1 and 4, the cutting surfaces 158a, 158b, 162a, 162b, 168a, 168b, 170a, 170b of the first, second, third, and fourth pairs of cutting members 156a, 156b, 160a, 160b, 164a, 164b, 166a, 166b move toward one another upon pivotal movement of the first and second elongated members 102, 104 about the pivot axis 234, corresponding to the fastener 126, relative to each other such that the proximal end 106 of the first elongated member 102 and the proximal end 114 of the second elongated member 104 move toward one another as the electrical cable stripping and cutting tool 100 moves toward the closed position.

Figure 5:
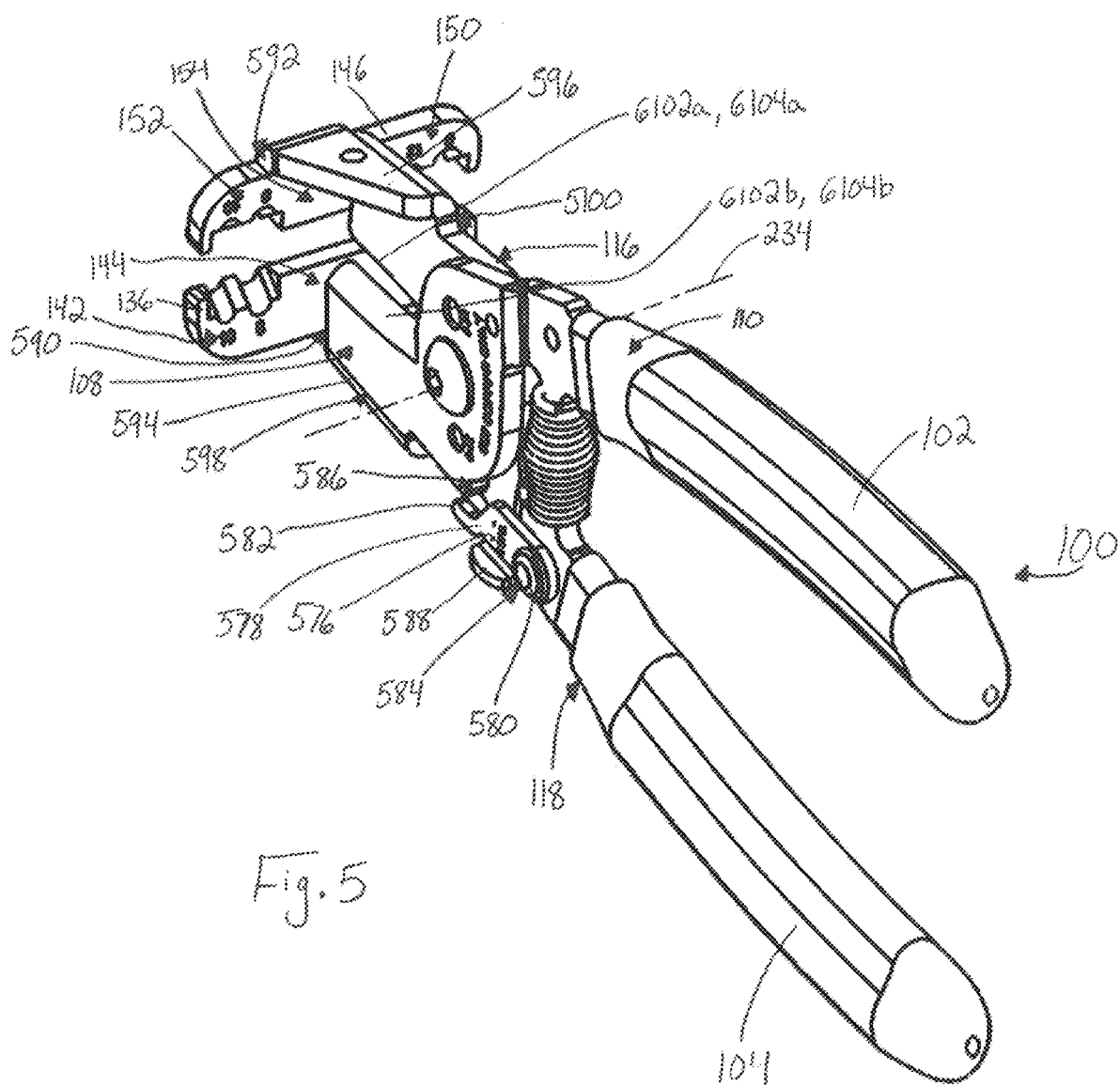
FIG. 5 is a rear perspective view of the aspect of FIG. 1, in the open configuration.

As shown in FIG. 5, the electrical cable stripping and cutting tool 100 may include a locking mechanism 576. The locking mechanism 576 may be positioned on at least one of the first and second elongated members 102, 104. After the first and second elongated members 102, 104 are pivoted about the pivot axis 234 relative to each other such that the electrical cable stripping and cutting tool 100 is moved from the open position to the closed position, the locking mechanism 576 may be actuated to maintain the electrical cable stripping and cutting tool 100 in the closed position. The locking mechanism 576 may include a rotatable lever 578 and a pivot pin 580. The lever 578 is an elongated flat member having an locking end 582 at one end of the lever 578 and a circular opening 584 adjacent to the other end of the lever 578. The circular opening 584 is dimensioned and configured to receive the pivot pin 580, which may be mounted in a permanent and non-removable manner on the second elongated member 104 so as to project substantially perpendicular to the length and longitudinal axis 248 of the second elongated member 104. Alternatively, the pivot pin 580 may be removably mounted to the second elongated member 104, permanently mounted to the first elongated member 102, or removably mounted to the first elongated member 102. When the pivot pin 580 is received in the circular opening 584, the lever 578 pivotally or rotatably mounted on the pivot pin 580.

The first elongated member 102 may have a locking surface 586 that is capable of receiving the locking end 582 of the lever 578. Alternatively, the locking surface 586 may be located on the second elongated member 104. In use of the locking mechanism 576, after the first and second elongated members 102, 104 are pivoted about the pivot axis 234 relative to each other such that the electrical cable stripping and cutting tool 100 is moved from the open position to the closed position, the lever 578 may be rotated to abut the locking end 582 of the lever 578 against the locking surface 586 of the first elongated member 102. The engagement of the locking end 582 of the lever 578 with the locking surface 586 prevents the electrical cable stripping and cutting tool 100 from moving to the open position. However, when the lever 578 is in engagement with the locking surface 586, the first and second elongated members 102, 104 may be spaced apart a small, predetermined distance. To assist in pivoting the lever 578 so as to move the locking end 582 of the lever 578 into and out of engagement with the locking surface 586, a thumb plate 588 may be attached to or formed in one piece with the lever 578 in a manner so as to project substantially perpendicular to the length 110, 118 and longitudinal axis 238, 248 of the first and second elongated members 102, 104 in the same direction as the pivot axis 234.

The first and second face plates 136, 146 may each be indirectly attached to the distal ends 108, 116 of the first and second elongated members 102, 104. Although only clearly seen as the second elongated member 104 in FIG. 5, the first and second face plates 136, 146 each may be attached to a first connection end 590, 592 of first and second connection elements 594, 596, respectively. A second connection end 598, 5100 of the first and second connection elements 594, 596 are attached to the distal end 108, 116 of the first and second elongated members 102, 104, respectively. The first face plate 136, the first elongated member 102, and the first connection element 594, when provided, may be integrally manufactured as a single piece. As used herein, the phrase "integrally manufactured as a single piece" indicates a situation wherein the structures described as such are manufactured and used as a single piece, not assembled from subcomponents. The second face plate 146, the second elongated member 104, and the second connection element 596, when provided, may be integrally manufactured as a single piece. Alternatively, a portion of the lengths 144, 154 of the first and second face plates 136, 146 between the first and second sides 140, 142, 150, 152 of the first and second face plates 136, 146 may be directly attached (i.e., without intervening first and second connection elements 594, 596) to the distal ends 108, 116 of the first and second elongated members 102, 104.

Figure 6:
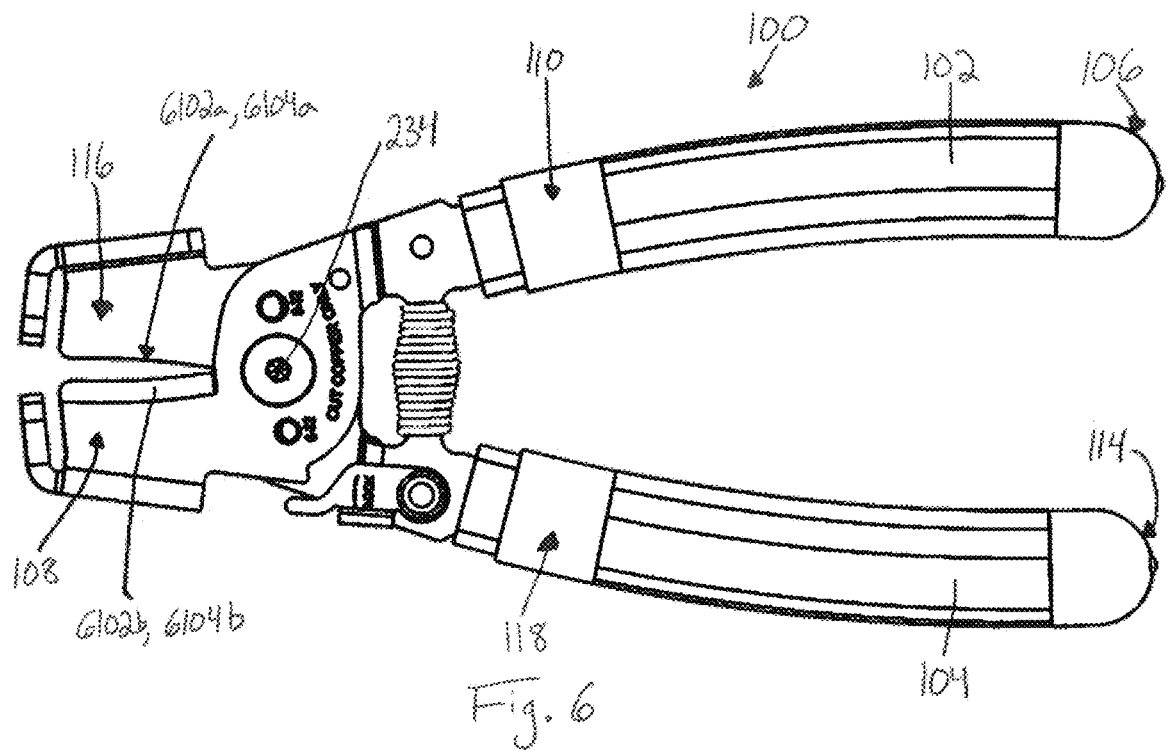
FIG. 6 is a side view of the aspect of FIG. 1, in the open configuration.
Figure 7:
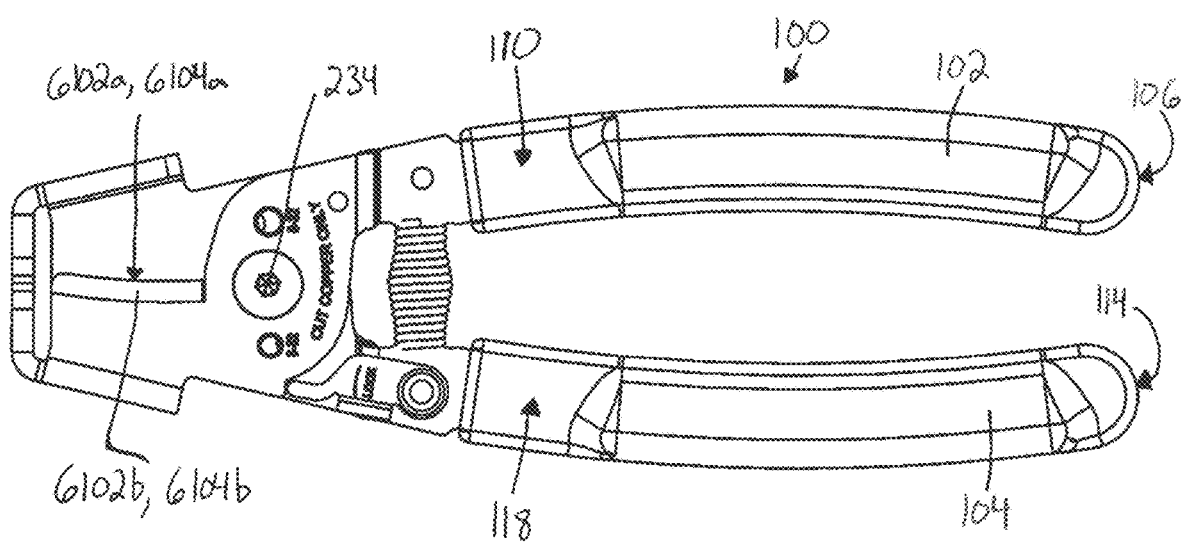
FIG. 7 is a side view of the aspect of FIG. 1, in the closed configuration.

As shown in FIGS. 6-7, a shearing pair of cutting members 6102 (shown here as shearing pair of cutting members 6102a, 6102b) may be formed on the first and second elongated members 102, 104. One of the shearing pair of cutting members 6102a, 6102b is formed on one of the first and second elongated members 102, 104. The other of the shearing pair of cutting members 6102a, 6102b is formed on the other of the first and second elongated members 102, 104. Each of the shearing pair of cutting members 6102*a*, 6102*b* has a cutting surface 6104 (shown here as cutting surfaces 6104*a*, 6104*b*) oriented along the length 110 of the first elongated member 102 and the length 118 of the second elongated member 104. Each cutting surface 6104*a*, 6104*b* of the shearing pair of cutting members 6102*a*, 6102*b* may be at least partially arcuate. Each cutting surface 6104*a*, 6104*b* of the shearing pair of cutting members 6102*a*, 6102*b* is presented toward the other cutting surface 6104*a*, 6104*b* of the shearing pair of cutting members 6102*a*, 6102*b*.

As shown in FIGS. 6-7, the cutting surfaces 6104*a*, 6104*b* of the shearing pair of cutting members 6102*a*, 6102*b* move toward one another upon pivotal movement of the first and second elongated members 102, 104 about the pivot axis 234 relative to each other such that the proximal end 106 of the first elongated member 102 and the proximal end 114 of the second elongated member 104 move toward one another as the electrical cable stripping and cutting tool 100 is moved toward the closed position. The shearing pair of cutting members 6102*a*, 6102*b* is formed and/or positioned such that the cutting surfaces 6104*a*, 6104*b* of the shearing pair of cutting members 6102*a*, 6102*b* will pass by one another in close proximity to one another as the electrical cable stripping and cutting tool 100 is moved toward the closed position. The cutting surfaces 6104*a*, 6104*b* of the shearing pair of cutting members 6102*a*, 6102*b* may be at least partially shaped and dimensioned for collectively shear-cutting the electrical cable when at least a portion of the electrical cable extends laterally between the shearing pair of cutting members 6102*a*, 6102*b*. The cutting surfaces 6104*a*, 6104*b* of the shearing pair of cutting members 6102*a*, 6102*b* may also be used to cut the electrical conductor of the electrical cable to an appropriate length for connection to an electrical outlet or other electrical device.

Figure 8:
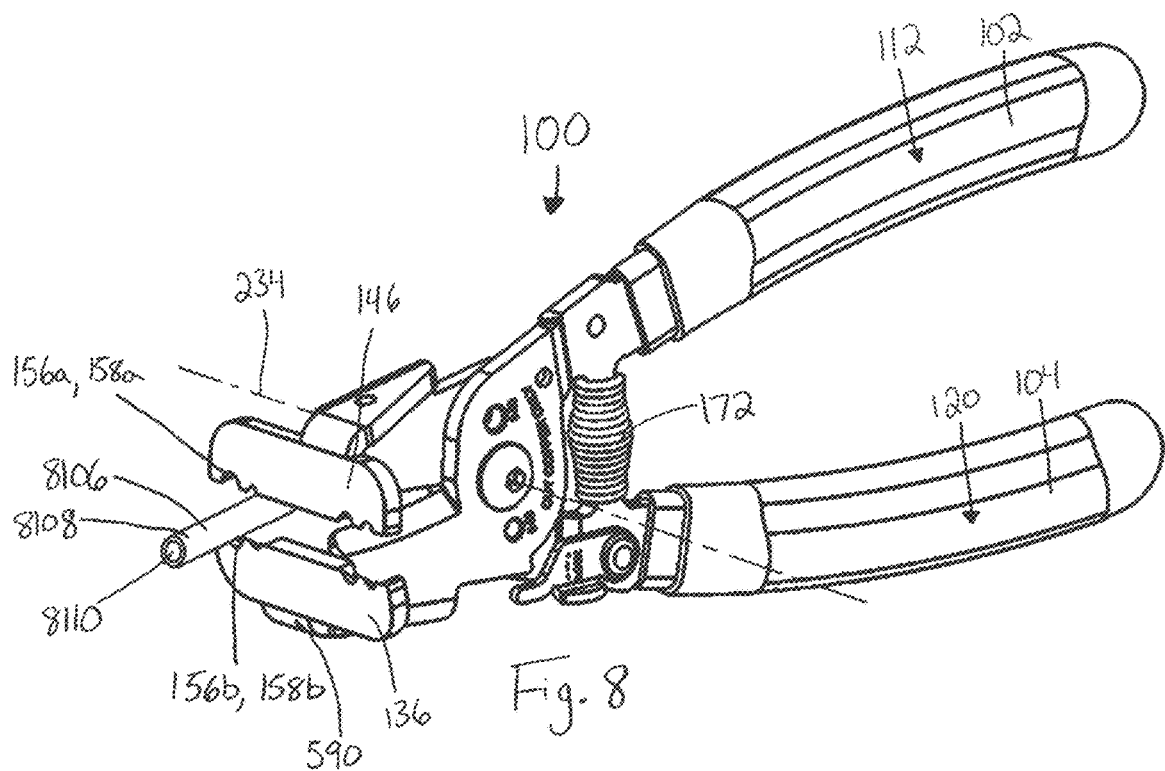
FIGS. 8-9 schematically illustrate an example sequence of operation of the aspect of FIG. 1.

In use, the electrical cable stripping and cutting tool 100, as described above, is provided to a user. The electrical cable stripping and cutting tool 100 may be used as a hand tool to strip and cut a non-metallic electrical cable. As shown in FIG. 8, such electrical cable 8106 includes a non-metallic outer sheath 8108, typically formed from an electrically-insulating polyvinyl chloride material. The outer sheath 8108 surrounds an electrical conductor 8110. The electrical conductor 8110 may be, for example, a single, solid strand of metal, such as copper or aluminum, or a strand fabricated from several metal filaments twisted or braided together. As shown, the electrical conductor has a circular cross-section, and the electrical conductor 8110 is surrounded by circular cross-section outer sheath 8108. The electrical conductor 8110 is commonly referred to as a wire.

The electrical cable 8106, as described above, is provided to the user. The electrical cable stripping and cutting tool 100 is moved to an open position. The first and second elongated members 102, 104 may be spread apart under the bias of the biasing member 164 to move the electrical cable stripping and cutting tool 100 into the open position. If the user desires to shear-cut the electrical cable 8106 to remove a portion of the electrical cable, at least a portion of the electrical cable 8106 is placed longitudinally between the shearing pair of cutting members 6102*a*, 6102*b*.

With the electrical cable 8106 longitudinally between the shearing pair of cutting members 6102*a*, 6102*b*, a portion of the electrical cable 8106 is cut at least partially through by moving the electrical cable stripping and cutting tool 100 toward the closed position. A force may be applied to the handle portions 112, 120 of the first and second elongated members 102, 104 to move the electrical cable stripping and cutting tool 100 into the closed position. The force applied to the handle portions 112, 120 of the first and second elongated members 102, 104 causes the handle portions 112, 120 to move together, the first and second elongated members 102, 104 to pivot about the pivot axis 234, and the first and second face plates 136, 146 to move together. The motion of the electrical cable stripping and cutting tool 100 toward the closed position causes the cutting surfaces 6104*a*, 6104*b* of the shearing pair of cutting members 6102*a*, 6102*b* to move together over the electrical cable 8106 to shear-cut at least partially through a portion of the electrical cable 8106.

If the user desires to cut and strip at least a portion of the outer sheath 8108 from the electrical cable 8106, as shown in FIG. 8, the user may place at least a portion of the electrical cable 8106 between one of the first, second, third, and fourth pairs of cutting members 156*a*, 156*b*, 160*a*, 160*b*, 164*a*, 164*b*, 166*a*, 166*b* depending on the dimensions of the outer sheath 8108 of the electrical cable 8106. For example, if the corresponding electrical conductor 8110 is a 6 Gauge conductor 8110 and the cutting surfaces 158*a*, 158*b* of the first pair of cutting members 156*a*, 158*b* are dimensioned to cut through the outer sheath 8108 covering the 6 Gauge electrical conductor 8110, at least a portion of the outer sheath 8108 covering the corresponding electrical conductor 8110 is placed laterally between the first pair of cutting members 156*a*, 158*b*. If the corresponding electrical conductor 8110 is a 12 Gauge electrical conductor 8110 and the cutting surfaces 162*a*, 162*b* of the second pair of cutting members 160*a*, 160*b* are dimensioned to cut through the outer sheath 8108 covering the 12 Gauge electrical conductor 8110, at least a portion of the outer sheath 8108 covering the corresponding electrical conductor 8110 is placed laterally between the second pair of cutting members 160*a*, 160*b*.

If the corresponding electrical conductor 8110 is an 8 Gauge electrical conductor 8110 and the cutting surfaces 168*a*, 168*b* of the third pair of cutting members 164*a*, 164*b* are dimensioned to cut through the outer sheath 8108 covering the 8 Gauge electrical conductor 8110, at least a portion of the outer sheath 8108 covering the corresponding electrical conductor 8110 is placed laterally between the third pair of cutting members 164*a*, 164*b*. If the corresponding electrical conductor 8110 is a 10 Gauge electrical conductor 8110 and the cutting surfaces 170*a*, 170*b* of the fourth pair of cutting members 166*a*, 166*b* are dimensioned to cut through the outer sheath 8108 covering the 10 Gauge electrical conductor 8110, at least a portion of the outer sheath 8108 covering the corresponding electrical conductor 8110 is placed laterally between the fourth pair of cutting members 166*a*, 166*b*.

Figure 9:
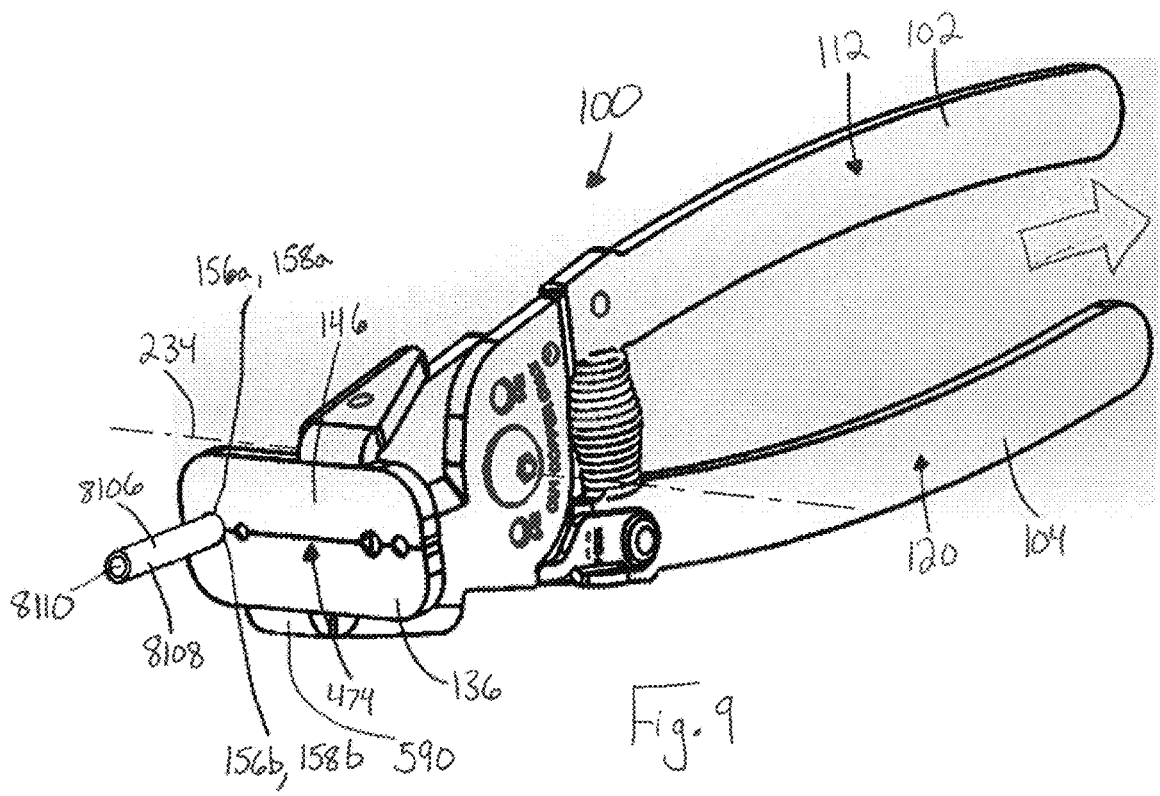

Accordingly, if the user desires to cut and strip at least a portion of one of the outer sheath 8108 covering an electrical conductor 8110, the user first determines the dimensions of the electrical cable 8106, such as by determining whether the outer sheath 8108 has the first, second, third, or fourth sheath dimension. Upon determining that the outer sheath 8108 of the electrical cable 8106 has the first sheath dimension, for example, at least a portion of the outer sheath having the first sheath dimension and covering a corresponding electrical conductor 8110 is placed laterally between the first pair of cutting members 156*a*, 156*b*, as shown in FIG. 8. As shown in FIGS. 8-9, with the outer sheath 8108 of the electrical cable 8106 between the first pair of cutting members 156*a*, 156*b*, a portion of the outer sheath 8108 is cut at least partially through by moving the electrical cable stripping and cutting tool 100 toward the closed position. The motion of the electrical cable stripping and cutting tool 100 toward the closed position causes the cutting surfaces 158*a*, 158*b* of the first pair of cutting members 156*a*, 156*b* to move together over the outer sheath 8108 of the electrical cable 8106 to cut at least partially through a portion of the outer sheath 8108 covering the corresponding electrical conductor 8110.

The cut portion of the outer sheath 8108 is removed from the electrical cable 8106 to expose the corresponding electrical conductor 8110. For example, with the outer sheath 8108 of the electrical cable 8106 between the first pair of cutting members 156*a*, 156*b* and the electrical cable stripping and cutting tool 100 in the closed position, the electrical cable 8106 is held stationary and the electrical cable stripping and cutting tool 100 is laterally moved in a laterally proximal direction (shown as an arrow in FIG. 9) with respect to the electrical cable 8106 to at least partially urge the cut portion of the outer sheath 8108 laterally in the laterally proximal direction with respect to the electrical cable 8106. Instead of laterally moving the electrical cable stripping and cutting tool 100 is in the laterally proximal direction, the cut portion of the outer sheath 8108 may be pulled off from the electrical cable 8106 by the user to expose the corresponding conductor 8110. The electrical cable stripping and cutting tool 100 is then moved to the open position.

Alternatively, upon determining that the electrical cable 8106 has one of the second, third, and fourth sheath dimensions, at least a portion of the outer sheath 8108 may be placed laterally between a corresponding one of the second, third, and fourth pairs of cutting members 160*a*, 160*b*, 164*a*, 164*b*, 166*a*, 166*b*. The electrical cable 8106, once positioned laterally between a corresponding one of the second, third, and fourth pairs of cutting members 160*a*, 160*b*, 164*a*, 164*b*, 166*a*, 166*b*, may be cut and stripped in a similar manner as described above.

After the user has utilized the electrical cable stripping and cutting tool 100 to cut and strip at least a portion of the outer sheath 8108 covering the electrical conductor 8110 to expose a portion of the electrical conductor 8110, the user may then shear-cut the exposed electrical conductor 8110 and/or any other portion of the electrical cable 8106 with the shearing pair of cutting members 6102*a*, 6102*b* in a similar sequence as described above.

Although the electrical cable stripping and cutting tool 100 has been described above as cutting and stripping an electrical cable 8106 having a non-metallic outer sheath 8108 that surrounds an electrical conductor 8110, the electrical cable stripping and cutting tool 100 may be configured and/or utilized to cut and strip any desired electrical cable.

Figure 10:
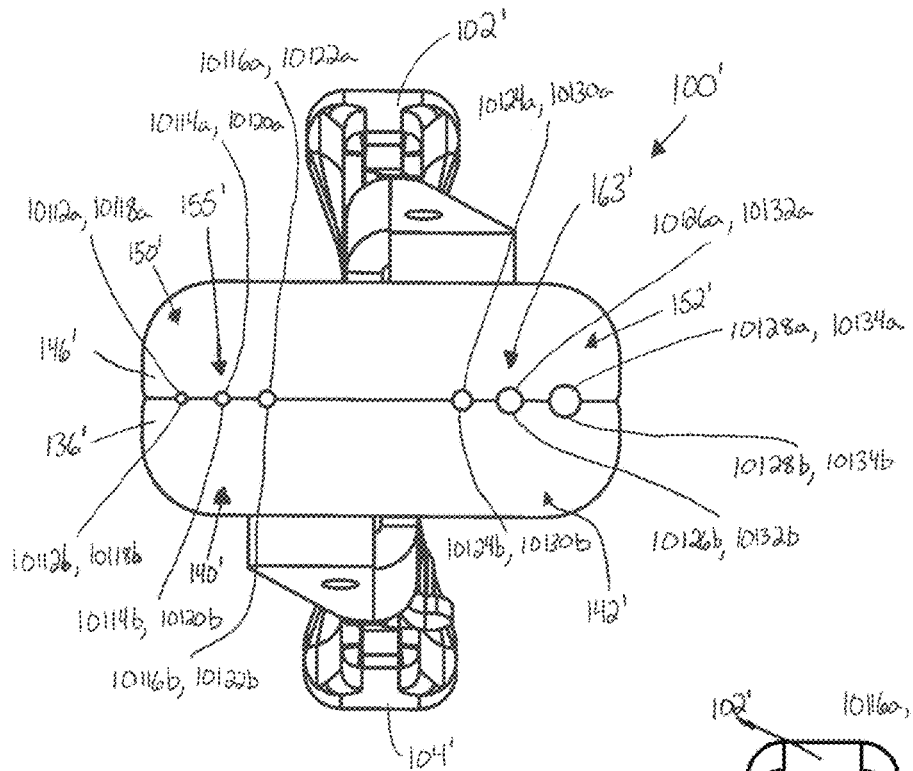
FIG. 10 is a front view of an electrical cable stripping and cutting tool according to another aspect of the present invention, in a closed configuration.
Figure 11:
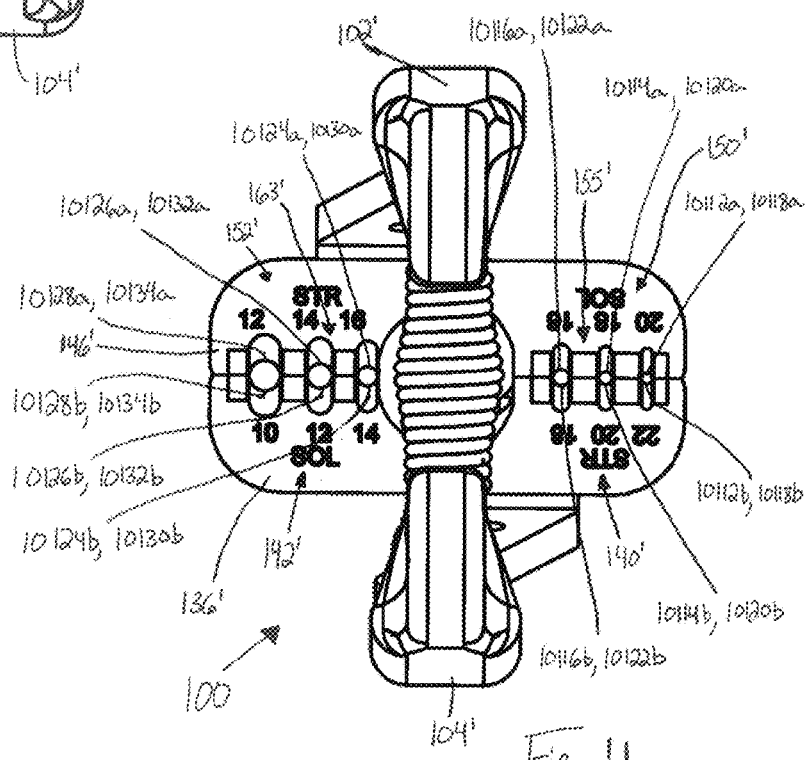
FIG. 11 is a rear view of the aspect of FIG. 10, in the closed configuration.

FIGS. 10-11 shows another configuration for the electrical cable stripping and cutting tool 100', which may differ from that shown in FIGS. 1-9. Therefore, structures of FIGS. 10-11 that are the same as or similar to those described with reference to FIGS. 1-9 are either unnumbered or have the same reference numbers with the addition of a "prime" mark. Description of common elements and operation similar to those in the previously described configuration will not be repeated with respect to the configuration of FIGS. 10-11, for brevity.

The electrical cable stripping and cutting tool 100' of FIGS. 10-11 is substantially the same as the electrical cable stripping and cutting tool 100 of FIGS. 1-9, except for the configuration of the at least one first side pair of cutting members 155' and the configuration of the at least one second side pair of cutting members 163'. As shown in FIGS. 10-11, the at least one first side pair of cutting members 155' includes a plurality of first side pairs of cutting members 155'. In particular, the first side pairs of cutting members 155' includes a fifth pair of cutting members 10112 (shown here as the fifth pair of cutting members 10112*a*, 10112*b*), a sixth pair of cutting members 10114 (shown here as the sixth pair of cutting members 10114*a*, 10114*b*), and a seventh pair of cutting members 10116 (shown here as the seventh pair of cutting members 10116*a*, 10116*b*), each of which are formed on the first side 140', 150' of the first and second face plates 136', 146'. One of each of the fifth, sixth, and seventh pairs of cutting members 10112*a*, 10112*b*, 10114*a*, 10114*b*, 10116*a*, 10116*b* is formed on one of the first and second face plates 136', 146'. The other of each of the fifth, sixth, and seventh pairs of cutting members 10112*a*, 10112*b*, 10114*a*, 10114*b*, 10116*a*, 10116*b* is formed on the other of the first and second face plates 136', 146'.

Each of the fifth, sixth, and seventh pairs of cutting members 10112*a*, 10112*b*, 10114*a*, 10114*b*, 10116*a*, 10116*b* has a cutting surface 10118, 10120, 10122 (shown here as cutting surfaces 10118*a*, 10118*b*, 10120*a*, 10120*b*, 10122*a*, 10122*b*), respectively, oriented lateral to the longitudinal axis 238' of the first elongated member 102' and the longitudinal axis 248' of the second elongated member 104'. Each cutting surface 10118*a*, 10118*b*, 10120*a*, 10120*b*, 10122*a*, 10122*b* of each of the fifth, sixth, and seventh pairs of cutting members 10112*a*, 10112*b*, 10114*a*, 10114*b*, 10116*a*, 10116*b* is presented toward the other cutting surface 10118*a*, 10118*b*, 10120*a*, 10120*b*, 10122*a*, 10122*b* of each of the fifth, sixth, and seventh pairs of cutting members 10112*a*, 10112*b*, 10114*a*, 10114*b*, 10116*a*, 10116*b*.

The cutting surfaces 10118*a*, 10118*b* of the fifth pair of cutting members 10112*a*, 10112*b* are shaped and dimensioned to cut through an outer sheath of an electrical cable having a fifth sheath dimension without cutting an electrical conductor within the outer sheath when at least a portion of the electrical cable extends longitudinally between the fifth pair of cutting members 10112*a*, 10112*b*. The cutting surfaces 10120*a*, 10120*b* of the sixth pair of cutting members 10114*a*, 10114*b* are shaped and dimensioned to cut through an outer sheath of an electrical cable having a sixth sheath dimension, which is larger than the fifth sheath dimension, without cutting an electrical conductor within the outer sheath when at least a portion of the electrical cable extends longitudinally between the sixth pair of cutting members 10114*a*, 10114*b*. The cutting surfaces 10122*a*, 10122*b* of the seventh pair of cutting members 10116*a*, 10116*b* are shaped and dimensioned to cut through an outer sheath of an electrical cable having a seventh sheath dimension, which is larger than the sixth sheath dimension, without cutting an electrical conductor within the outer sheath when at least a portion of the electrical cable extends longitudinally between the seventh pair of cutting members 10116*a*, 10116*b*.

As shown in FIGS. 10-11, the dimensions of the fifth pair of cutting members 10112*a*, 10112*b* are smaller than the dimensions of the sixth pair of cutting members 10114*a*, 10114*b*, and the dimensions of the sixth pair of cutting members 10114*a*, 10114*b* are smaller than the dimensions of the seventh pair of cutting members 10116*a*, 10116*b*. The dimensions of any one of the first side pairs of cutting members 155' are thus smaller than the dimensions of any other of the first side pairs of cutting members 155' that are closer in the lateral direction to the second side 142', 152' of the first and second face plates 136', 146'. The dimensions of the first side pairs of cutting members 155' can sequentially increase by a predetermined amount from the fifth pair of cutting members 10112*a*, 10112*b* (i.e., the pair of cutting members that is on the first side 140', 150' of the first and second face plates 136', 146' and spaced furthest in the lateral direction from the second side 142', 152' of the first and second face plates 136', 146') toward the second side 142', 152' of the first and second face plates 136', 146'. The dimensions of the sixth pair of cutting members 10114a, 10114b can thus be sequentially larger by a predetermined amount than the dimensions of the fifth pair of cutting members 10112a, 10112b, and the dimensions of the seventh pair of cutting members 10116a, 10116b sequentially larger by the predetermined amount than the dimensions of the sixth pair of cutting members 10114a, 10114b.

As shown in FIGS. 10-11, the at least one second side pair of cutting members 163' includes a plurality of second side pairs of cutting members 163'. In particular, the second side pairs of cutting members 163' includes an eighth pair of cutting members 10124 (shown here as the eighth pair of cutting members 10124a, 10124b), a ninth pair of cutting members 10126 (shown here as the ninth pair of cutting members 10126a, 10126b), and a tenth pair of cutting members 10128 (shown here as the tenth pair of cutting members 10128a, 10128b), each of which are formed on the second side 142', 152' of the first and second face plates 136', 146'. One of each of the eighth, ninth, and tenth pairs of cutting members 10124a, 10124b, 10126a, 10126b, 10128a, 10128b is formed on one of the first and second face plates 136', 146'. The other of each of the eighth, ninth, and tenth pairs of cutting members 10124a, 10124b, 10126a, 10126b, 10128a, 10128b is formed on the other of the first and second face plates 136', 146'.

Each of the eighth, ninth, and tenth pairs of cutting members 10124a, 10124b, 10126a, 10126b, 10128a, 10128b have a cutting surface 10130, 10132, 10134 (shown here as cutting surfaces 10130a, 10130b, 10132a, 10132b, 10134a, 10134b), respectively, oriented lateral to the longitudinal axis 238' of the first elongated member 102' and the longitudinal axis 248' of the second elongated member 104'. Each cutting surface 10130a, 10130b, 10132a, 10132b, 10134a, 10134b of each of the eighth, ninth, and tenth pairs of cutting members 10124a, 10124b, 10126a, 10126b, 10128a, 10128b is presented toward the other cutting surface 10130a, 10130b, 10132a, 10132b, 10134a, 10134b of each of the eighth, ninth, and tenth pairs of cutting members 10124a, 10124b, 10126a, 10126b, 10128a, 10128b.

The cutting surfaces 10130a, 10130b of the eighth pair of cutting members 10124a, 10124b are shaped and dimensioned to cut through an outer sheath of an electrical cable having a eighth sheath dimension without cutting an electrical conductor within the outer sheath when at least a portion of the electrical cable extends longitudinally between the eighth pair of cutting members 10124a, 10124b. The cutting surfaces 10132a, 10132b of the ninth pair of cutting members 10126a, 10126b are shaped and dimensioned to cut through an outer sheath of an electrical cable having a ninth sheath dimension, which is larger than the eighth sheath dimension, without cutting an electrical conductor within the outer sheath when at least a portion of the electrical cable extends longitudinally between the ninth pair of cutting members 10126a, 10126b. The cutting surfaces 10134a, 10134b of the tenth pair of cutting members 10128a, 10128b are shaped and dimensioned to cut through an outer sheath of an electrical cable having a tenth sheath dimension, which is larger than the ninth sheath dimension, without cutting an electrical conductor within the outer sheath when at least a portion of the electrical cable extends longitudinally between the tenth pair of cutting members 10128a, 10128b.

As shown in FIGS. 10-11, the dimensions of the eighth pair of cutting members 10124a, 10124b are smaller than the dimensions of the ninth pair of cutting members 10126a, 10126b, and the dimensions of the ninth pair of cutting members 10126a, 10126b are smaller than the dimensions of the tenth pair of cutting members 10128a, 10128b. The dimensions of any one of the second side pairs of cutting members 163' are thus larger than the dimensions of any other of the second side pairs of cutting members 163' that are closer in the lateral direction to the first side 140', 150' of the first and second face plates 136', 146'. The dimensions of the second side pairs of cutting members 163' can sequentially decrease by a predetermined amount from the tenth pair of cutting members 10128a, 10128b (i.e., the pair of cutting members that is on the second side 142', 152' of the first and second face plates 136', 146' and spaced furthest in the lateral direction from the first side 140', 150' of the first and second face plates 136', 146') toward the first side 140', 150' of the first and second face plates 136', 146'. The dimensions of the tenth pair of cutting members 10128a, 10128b can thus be sequentially larger by a predetermined amount than the dimensions of the ninth pair of cutting members 10126a, 10126b, and the dimensions of the ninth pair of cutting members 10126a, 10126b sequentially larger by the predetermined amount than the dimensions of the eighth pair of cutting members 10124a, 10124b.

In the configuration shown in FIGS. 10-11, the dimensions of any of the second side pairs of cutting members 163' are larger than the dimensions of the first side pairs of cutting members 155'. The dimensions of the first and second side pairs of cutting members 155', 163' can sequentially increase by a predetermined amount in the lateral direction from the fifth pair of cutting members 10112a, 10112b (i.e., the pair of cutting members that is on the first side 140', 150' of the first and second face plates 136', 146' and spaced furthest in the lateral direction from the second side 142', 152' of the first and second face plates 136', 146') toward the tenth pair of cutting members 10128a, 10128b (i.e., the pair of cutting members that is on the second side 142', 152' of the first and second face plates 136', 146' and spaced furthest in the lateral direction from the first side 140', 150' of the first and second face plates 136', 146'). The dimensions of the tenth pair of cutting members 10128a, 10128b can thus be sequentially larger by a predetermined amount than the dimensions of the ninth pair of cutting members 10126a, 10126b, and the dimensions of the ninth pair of cutting members 10126a, 10126b sequentially larger by the predetermined amount than the dimensions of the eighth pair of cutting members 10124a, 10124b. The dimensions of the eighth pair of cutting members 10124a, 10124b can be sequentially larger by the predetermined amount than the dimensions of the seventh pair of cutting members 10116a, 10116b, and the dimensions of the seventh pair of cutting members 10116a, 10116b can be sequentially larger by the predetermined amount than the dimensions of the sixth pair of cutting members 10114a, 10114b. The dimensions of the sixth pair of cutting members 10114a, 10114b can be sequentially larger by the predetermined amount than the dimensions of the fifth pair of cutting members 10112a, 10112b.

The first and second elongated members 102, 102', 104, 104', the locking mechanism 568, 568', the first and second first face plates 136, 136', 146, 146', the first and second connection elements 594, 594', 596, 596', when provided, the fastener 126, 126', and/or the biasing member 172, 172', can each be at least partially formed from silicone, polyethylene, polypropylene, steel, titanium, any other suitable material, or any combination thereof.

Additionally, it is contemplated that each of the electrical cable cutting and stripping tools 100, 100' may have a different number of pairs of cutting members than what is described above and/or shown in the Figures.

It is contemplated that the connecting portions 122, 122', 124, 124' of the first and second elongated members 102, 102', 104, 104' may include more openings than the openings 225, 225', 227, 227' for allowing the first and second elongated members 102, 102', 104, 104' to be fit together in several configurations for stripping and cutting different sized electrical cables.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An electrical cable stripping and cutting tool configured for use with an electrical cable including an outer sheath radially surrounding at least one electrical conductor, the tool comprising:
    a first elongated member having a proximal end and a longitudinally opposite distal end;
    a second elongated member having a proximal end and a longitudinally opposite distal end, the second elongated member being joined to the first elongated member such that the first and second elongated members are pivotable about a laterally extending pivot axis relative to each other;
    a first face plate attached to the distal end of the first elongated member, the first face plate being oriented substantially perpendicular to a longitudinal axis of the first elongated member, the first face plate having a first side, a laterally opposite second side, and a central portion laterally between the first and second sides, the central portion of the first face plate intersecting the longitudinal axis of the first elongated member;
    a second face plate attached to the distal end of the second elongated member, the second face plate being oriented substantially perpendicular to a longitudinal axis of the second elongated member, the second face plate having a first side, a laterally opposite second side, and a central portion laterally between the first and second sides, the central portion of the second face plate intersecting the longitudinal axis of the second elongated member, in a closed position of the electrical cable stripping and cutting tool, the first side of the first face plate abutting the first side of the second face plate, the second side of the first face plate abutting the second side of the second face plate, and the first and second face plates collectively forming a single flat face plate;
    at least one first side pair of cutting members formed on the first side of the first and second face plates, each of the at least one first side pair of cutting members having an arcuate cutting surface presented toward the other arcuate cutting surface of the at least one first side pair of cutting members; and
    at least one second side pair of cutting members formed on the second side of the first and second face plates, each of the at least one second side pair of cutting members having an arcuate cutting surface presented toward the other arcuate cutting surface of the at least one second side pair of cutting members;
    wherein the at least one first side pair of cutting members is positioned on the first and second face plates and on a first lateral side of the longitudinal axes of the first and second elongated members, and the at least one second side pair of cutting members is positioned on the first and second face plates and on a second lateral side of the longitudinal axes of the first and second elongated members such that each pair of cutting members is not longitudinally aligned with any other portion of the electrical cable stripping and cutting tool, the second lateral side of the longitudinal axes being laterally opposite the first lateral side;
    wherein the central portions of the first and second face plates are free from arcuate cutting surfaces; and
    wherein the arcuate cutting surfaces of the at least one first side pair of cutting members being shaped and dimensioned to cut through an outer sheath of an electrical cable having a different sheath dimension than an outer sheath of an electrical cable that the arcuate cutting surfaces of the at least one second side pair of cutting members are shaped and dimensioned to cut through, the arcuate cutting surfaces of the first and second side pairs of cutting members being configured to cut through the outer sheaths without cutting through electrical conductors within the outer sheaths.

2. The electrical cable stripping and cutting tool of claim 1, wherein the at least one first side pair of cutting members includes
  a first pair of cutting members formed on the first side of the first and second face plates, each of the first pair of cutting members having an arcuate cutting surface presented toward the other arcuate cutting surface of the first pair of cutting members, the arcuate cutting surfaces of the first pair of cutting members being shaped and dimensioned to cut through an outer sheath of an electrical cable having a first sheath dimension without cutting the electrical conductor within the outer sheath, and
  a second pair of cutting members formed on the first side of the first and second face plates, each of the second pair of cutting members having an arcuate cutting surface presented toward the other arcuate cutting surface of the second pair of cutting members, the arcuate cutting surfaces of the second pair of cutting members being shaped and dimensioned to cut through an outer sheath of an electrical cable having a second sheath dimension without cutting the electrical conductor within the outer sheath, the second sheath dimension being different than the first sheath dimension.

3. The electrical cable stripping and cutting tool of claim 2, wherein the at least one second side pair of cutting members includes
  a third pair of cutting members formed on the second side of the first and second face plates, each of the third pair of cutting members having an arcuate cutting surface presented toward the other arcuate cutting surface of the third pair of cutting members, the arcuate cutting surfaces of the third pair of cutting members being shaped and dimensioned to cut through an outer sheath of an electrical cable having a third sheath dimension without cutting the electrical conductor within the outer sheath, the third sheath dimension being different than each of the first and second sheath dimensions, and
  a fourth pair of cutting members formed on the second side of the first and second face plates, each of the fourth pair of cutting members having an arcuate cutting surface presented toward the other arcuate cutting surface of the fourth pair of cutting members, the arcuate cutting surfaces of the fourth pair of cutting members being shaped and dimensioned to cut through an outer sheath of an electrical cable having a fourth sheath dimension without cutting the electrical conductor within the outer sheath, the third sheath dimension being different than each of the first, second and third sheath dimensions.

4. The electrical cable stripping and cutting tool of claim 3, wherein the at least one first side pair of cutting members further includes a fifth pair of cutting members formed on the first side of the first and second face plates, each of the fifth pair of cutting members having an arcuate cutting surface presented toward the other arcuate cutting surface of the fifth pair of cutting members, the arcuate cutting surfaces of the fifth pair of cutting members being shaped and dimensioned to cut through an outer sheath of an electrical cable having a fifth sheath dimension without cutting the electrical conductor within the outer sheath, the fifth sheath dimension being larger than the second sheath dimension, the second sheath dimension being larger than the first sheath dimension.

5. The electrical cable stripping and cutting tool of claim 4, wherein the at least one second side pair of cutting members further includes a sixth pair of cutting members formed on the second side of the first and second face plates, each of the sixth pair of cutting members having an arcuate cutting surface presented toward the other arcuate cutting surface of the sixth pair of cutting members, the arcuate cutting surfaces of the sixth pair of cutting members being shaped and dimensioned to cut through an outer sheath of an electrical cable having a sixth sheath dimension without cutting the electrical conductor within the outer sheath, the sixth sheath dimension being larger than the fourth sheath dimension, the fourth sheath dimension being larger than the third sheath dimension, the third sheath dimension being greater than the fifth sheath dimension.

6. The electrical cable stripping and cutting tool of claim 1, wherein the at least one first side pair of cutting members includes a plurality of first side pairs of cutting members, the dimensions of any one of the first side pairs of cutting members being smaller than the dimensions of any other of the first side pairs of cutting members that are closer in the lateral direction to the second side of the first and second face plates.

7. The electrical cable stripping and cutting tool of claim 6, wherein the at least one second side pair of cutting members includes a plurality of second side pairs of cutting members, the dimensions of any one of the second side pairs of cutting members being larger than the dimensions of any other of the second side pairs of cutting members that are closer in the lateral direction to the first side of the first and second face plates, the dimensions of each of the plurality of second side pairs of cutting members being larger than the dimensions of each of the plurality of first side pairs of cutting members.

8. The electrical cable stripping and cutting tool of claim 1, wherein one of the at least one first side pair of cutting members is formed on one of the first and second face plates, the other of the at least one first side pair of cutting members being formed on the other of the first and second face plates, each of the at least one first side pair of cutting members having the arcuate cutting surface oriented lateral to the longitudinal axis of the first elongated member and the longitudinal axis of the second elongated member, the arcuate cutting surfaces of the at least one first side pair of cutting members moving toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

9. The electrical cable stripping and cutting tool of claim 8, wherein one of the at least one second side pair of cutting members is formed on one of the first and second face plates, the other of the at least one second side pair of cutting members being formed on the other of the first and second face plates, each of the at least one second side pair of cutting members having the arcuate cutting surface oriented lateral to the longitudinal axis of the first elongated member and the longitudinal axis of the second elongated member, the arcuate cutting surfaces of the at least one second side pair of cutting members moving toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

10. The electrical cable stripping and cutting tool of claim 1, wherein the first and second face plates are each attached to a first connection end of first and second connection elements, respectively, a second connection end of the first and second connection elements being attached to the distal end of the first and second elongated members, respectively.

11. The electrical cable stripping and cutting tool of claim 10, wherein the first face plate, the first elongated member, and the first connection element are integrally manufactured as a single piece, and the second face plate, the second elongated member, and the second connection element are integrally manufactured as a single piece.

12. The electrical cable stripping and cutting tool of claim 1, including a shearing pair of cutting members formed on the first and second elongated members, one of the shearing pair of cutting members being formed on one of the first and second elongated members, the other of the shearing pair of cutting members being formed on the other of the first and second elongated members, each of the shearing pair of cutting members having a cutting surface oriented along a length of the first elongated member and a length of the second elongated member, the length of the first elongated member extending from the proximal end of the first elongated member to the distal end of the first elongated member, the length of the second elongated member extending from the proximal end of the second elongated member to the distal end of the second elongated member, each cutting surface of the shearing pair of cutting members being presented toward the other cutting surface of the shearing pair of cutting members, the cutting surfaces of the shearing pair of cutting members each being shaped and dimensioned for collectively shear cutting the electrical cable when at least a portion of the electrical cable extends laterally between the shearing pair of cutting members.

13. The electrical cable stripping and cutting tool of claim 12, wherein the cutting surfaces of the shearing pair of cutting members move toward one another upon pivotal movement of the first and second elongated members about the pivot axis relative to each other such that the proximal end of the first elongated member and the proximal end of the second elongated member move toward one another as the electrical cable stripping and cutting tool is moving toward the closed position.

14. The electrical cable stripping and cutting tool of claim 1, including a biasing member extending between the first and second elongated members, the biasing member biasing the electrical cable stripping and cutting tool toward an open position.

15. The electrical cable stripping and cutting tool of claim 14, wherein the biasing member is a spring.

16. The electrical cable stripping and cutting tool of claim 14, including a locking mechanism positioned on at least one of the first and second elongated members, wherein after the first and second elongated members are pivoted about the pivot axis relative to each other such that the electrical cable stripping and cutting tool is moved from the open position to the closed position, the locking mechanism is actuatable to maintain the electrical cable stripping and cutting tool in the closed position.

17. A method for cutting and stripping an electrical cable, the method comprising:
 providing an electrical cable including an outer sheath surrounding an electrical conductor;
 providing the electrical cable stripping and cutting tool of claim 1;
 moving the electrical cable stripping and cutting tool to an open position;
 determining whether the outer sheath of the electrical cable has a sheath dimension that corresponds to dimensions of the arcuate cutting surfaces of the at least one first side pair of cutting members or to the dimensions of the arcuate cutting surfaces of the at least one second side pair of cutting members;
 when it is determined that the outer sheath of the electrical cable has the sheath dimension that corresponds to dimensions of the arcuate cutting surfaces of the at least one first side pair of cutting members, removing a cut portion of the outer sheath from the electrical cable to expose a portion of the electric conductor by
  placing at least a portion of the electrical cable having the sheath dimension that corresponds to dimensions of the arcuate cutting surfaces of the at least one first side pair of cutting members longitudinally between the at least one first side pair of cutting members,
  with the electrical cable having the sheath dimension that corresponds to dimensions of the arcuate cutting surfaces of the at least one first side pair of cutting members longitudinally between the at least one first side pair of cutting members, cutting at least partially through a portion of the outer sheath by moving the electrical cable stripping and cutting tool toward the closed position, motion of the electrical cable stripping and cutting tool toward the closed position causing the arcuate cutting surfaces of the at least one first side pair of cutting members to move together over the electrical cable to cut at least partially through a portion of the outer sheath of the electrical cable, and
 removing the cut portion of the outer sheath; and
 when it is determined that the outer sheath of the electrical cable has the sheath dimension that corresponds to dimensions of the arcuate cutting surfaces of the at least one second side pair of cutting members, removing a cut portion of the outer sheath from the electrical cable to expose a portion of the electric conductor by
  placing at least a portion of the electrical cable having the sheath dimension that corresponds to dimensions of the arcuate cutting surfaces of the at least one second side pair of cutting members longitudinally between the at least one second side pair of cutting members,
  with the electrical cable having the sheath dimension that corresponds to dimensions of the arcuate cutting surfaces of the at least one second side pair of cutting members longitudinally between the at least one second side pair of cutting members, cutting at least partially through a portion of the outer sheath by moving the electrical cable stripping and cutting tool toward the closed position, motion of the electrical cable stripping and cutting tool toward the closed position causing the arcuate cutting surfaces of the at least one second side pair of cutting members to move together over the electrical cable to cut at least partially through a portion of the outer sheath of the electrical cable, and
 removing the cut portion of the outer sheath.

18. The method of claim 17, including:
with at least a portion of the electrical cable between at least one of the first and second side pairs of cutting members and the electrical cable stripping and cutting tool in the closed position, holding the electrical cable stationary and longitudinally moving the electrical cable stripping and cutting tool with respect to the electrical cable to at least partially urge the cut portion of the outer sheath longitudinally with respect to the electrical cable.

19. The method of claim 17, including spreading handle portions of the first and second elongated members apart under the bias of a biasing member to move the electrical cable stripping and cutting tool into the open position.

20. The method of claim 19, including applying a force to the first and second handles to move the electrical cable stripping and cutting tool into the closed position, the force applied to the first and second handles causing the handles to move together, the first and second elongated members to pivot about the pivot axis, and the first and second face plates to move together.

21. The electrical cable stripping and cutting tool of claim 1, wherein the first and second face plates are indirectly attached to the distal ends of the first and second elongated members via first and second connection elements, respectively, such that the first face plate is longitudinally aligned with and longitudinally spaced from a first longitudinal distal end face of the first elongate member and the second face plate is longitudinally aligned with and longitudinally spaced from a second longitudinal distal end face of the second elongate member.

22. The electrical cable stripping and cutting tool of claim 21, wherein a first connection end of the first connection element is attached to the first face plate substantially on the first lateral side of the elongate axes, a second connection end of the first connection element being attached to the distal end of the first elongate member,
a first connection end of the second connection element being attached to the second face plate substantially on the second lateral side of the elongate axes, a second connection end of the second connection element being attached to the distal end of the second elongate member.

23. An electrical cable stripping and cutting tool configured for use with an electrical cable including an outer sheath radially surrounding at least one electrical conductor, the tool comprising:
a first elongated member having a proximal end and a longitudinally opposite distal end;
a second elongated member having a proximal end and a longitudinally opposite distal end, the second elongated member being joined to the first elongated member such that the first and second elongated members are pivotable about a laterally extending pivot axis relative to each other;
a first face plate attached to the distal end of the first elongated member, the first face plate being oriented substantially perpendicular to a longitudinal axis of the first elongated member, the first face plate having a first side, a laterally opposite second side, and a central portion laterally between the first and second sides, the central portion of the first face plate intersecting the longitudinal axis of the first elongated member;
a second face plate attached to the distal end of the second elongated member, the second face plate being oriented substantially perpendicular to a longitudinal axis of the second elongated member, the second face plate having a first side, a laterally opposite second side, and a central portion laterally between the first and second sides, the central portion of the second face plate intersecting the longitudinal axis of the second elongated member, in a closed position of the electrical cable stripping and cutting tool, the first side of the first face plate abutting the first side of the second face plate, and the second side of the first face plate abutting the second side of the second face plate,
the first and second face plates mirroring one another, each of the first and second face plates being configured to be selectively pivoted toward the other of the first and second face plates and into the closed position;
at least one first side pair of cutting members formed on the first side of the first and second face plates; and
at least one second side pair of cutting members formed on the second side of the first and second face plates, the at least one second side pair of cutting members being configured to cut through an outer sheath of an electrical cable having a different sheath dimension than an outer sheath of an electrical cable that the at least one first side pair of cutting members are configured to cut through;
wherein the at least one first side pair of cutting members is positioned on the first and second face plates and on a first lateral side of the longitudinal axes of the first and second elongated members, and the at least one second side pair of cutting members is positioned on the first and second face plates and on a second lateral side of the longitudinal axes of the first and second elongated members such that each pair of cutting members is not longitudinally aligned with any other portion of the electrical cable stripping and cutting tool, the second lateral side of the longitudinal axes being laterally opposite the first lateral side; and
wherein the central portions of the first and second face plates are free from cutting members.

* * * * *